(12) United States Patent
Herzer et al.

(10) Patent No.: US 8,109,251 B2
(45) Date of Patent: *Feb. 7, 2012

(54) LPG FUELED INTERNAL COMBUSTION ENGINE POWERED DEVICES

(76) Inventors: Bernardo J. Herzer, Culver City, CA (US); David Kostka, San Pedro, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,893

(22) Filed: Nov. 1, 2010

(65) Prior Publication Data

US 2011/0083759 A1 Apr. 14, 2011

Related U.S. Application Data

(63) Continuation of application No. 11/977,372, filed on Oct. 24, 2007, now Pat. No. 7,878,170.

(51) Int. Cl.
*F02B 67/00* (2006.01)
*F02B 43/00* (2006.01)

(52) U.S. Cl. ....... 123/195 A; 123/527; 141/18; 220/581; 220/737

(58) Field of Classification Search .............. 123/195 A, 123/527; 141/18; 220/581, 737
See application file for complete search history.

(56) References Cited

U.S. PATENT DOCUMENTS

| | | | |
|---|---|---|---|
| 3,018,914 A | 1/1962 | Webster | |
| 3,941,554 A | 3/1976 | Curtis | 431/89 |
| 3,960,126 A | 6/1976 | Shinoda | 123/120 |
| 3,978,823 A | 9/1976 | Simon | 123/1 A |
| 4,223,692 A * | 9/1980 | Perry | 137/78.4 |
| 4,327,553 A | 5/1982 | Rilett | 60/673 |
| 4,420,022 A | 12/1983 | Landry | 141/18 |
| 4,485,792 A | 12/1984 | Van Der Weide | 123/527 |
| 4,492,208 A | 1/1985 | Lent | 123/527 |
| D295,886 S | 5/1988 | Dolton et al. | D23/205 |
| 4,811,720 A | 3/1989 | Katumata | 123/527 |
| 4,819,589 A | 4/1989 | Nagashima | 123/184.23 |
| 4,827,147 A | 5/1989 | Mizushima | 290/1 |
| 4,881,520 A | 11/1989 | Hefling | 126/44 |
| 4,912,303 A | 3/1990 | Beavers et al. | 219/535 |
| 5,086,748 A | 2/1992 | Yokoyama | 323/549 |
| 5,162,662 A | 11/1992 | Nakayama | 290/1 |
| 5,212,952 A | 5/1993 | Yokoyama et al. | 60/721 |
| 5,335,954 A | 8/1994 | Holub et al. | 294/31.2 |
| 5,542,398 A | 8/1996 | Marcon | 123/525 |
| 5,581,986 A | 12/1996 | Calver | 56/12.7 |
| 5,606,944 A | 3/1997 | Kurihara | 123/90.3 |
| 5,671,711 A | 9/1997 | Collie | 123/299 |
| 5,676,117 A | 10/1997 | Williams | 123/527 |
| 5,713,343 A | 2/1998 | Taylor et al. | 126/4 |
| 5,775,281 A | 7/1998 | Smith | 123/179.8 |
| 5,884,460 A | 3/1999 | Serravalle et al. | 56/1 |
| 5,896,847 A | 4/1999 | Usuki | 123/557 |

(Continued)

FOREIGN PATENT DOCUMENTS

JP 57179349 A * 11/1982

(Continued)

*Primary Examiner* — Noah Kamen
(74) *Attorney, Agent, or Firm* — Don Finkelstein

(57) ABSTRACT

A gas phase of LPG such as propane is used to power a small internal combustion engine driving or powering a preselected device such as a powered lawnmower, weed whacker, string trimmer, leaf blower or the like and the fuel system is provided with heating arrangements that insure the gas phase of the LPG is discharged from the LPG tank for all operating conditions of the device.

17 Claims, 4 Drawing Sheets

U.S. PATENT DOCUMENTS

| | | | |
|---|---|---|---|
| 5,918,574 A | 7/1999 | Kobayashi | 123/195 |
| 5,924,400 A | 7/1999 | Kobayashi | 123/196 |
| D418,809 S | 1/2000 | Frank | D13/112 |
| 6,310,404 B1 | 10/2001 | Frank | 290/1 |
| 6,441,505 B1 | 8/2002 | Poletti et al. | 290/1 |
| 6,661,107 B2 | 12/2003 | Higuchi et al. | 290/1 |
| 6,750,556 B2 | 6/2004 | Sodemann | 290/1 |
| 6,857,351 B2 | 2/2005 | Cutter et al. | 99/279 |
| 7,412,973 B2 | 8/2008 | Price | 123/538 |
| 2007/0089692 A1 | 4/2007 | Kochi et al. | 123/44.7 |

FOREIGN PATENT DOCUMENTS

| | | |
|---|---|---|
| JP | 3-111658 | 5/1991 |
| JP | 8-11558 | 1/1996 |
| JP | 9-151749 | 6/1997 |
| JP | 9-250388 | 9/1997 |
| JP | 11-241653 | 7/1999 |
| JP | 281-182634 | 7/2001 |
| JP | 2001-182634 | 7/2001 |

\* cited by examiner

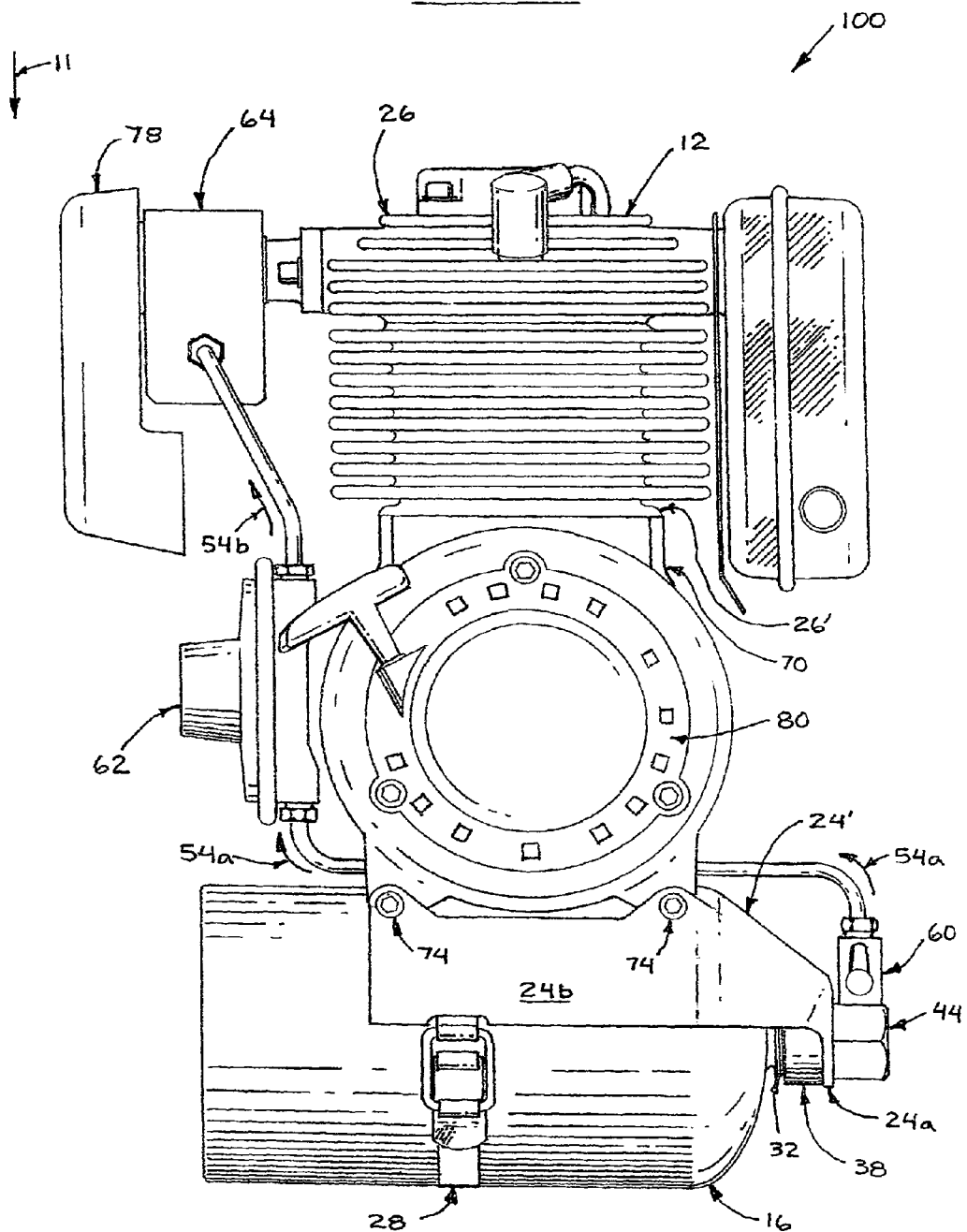

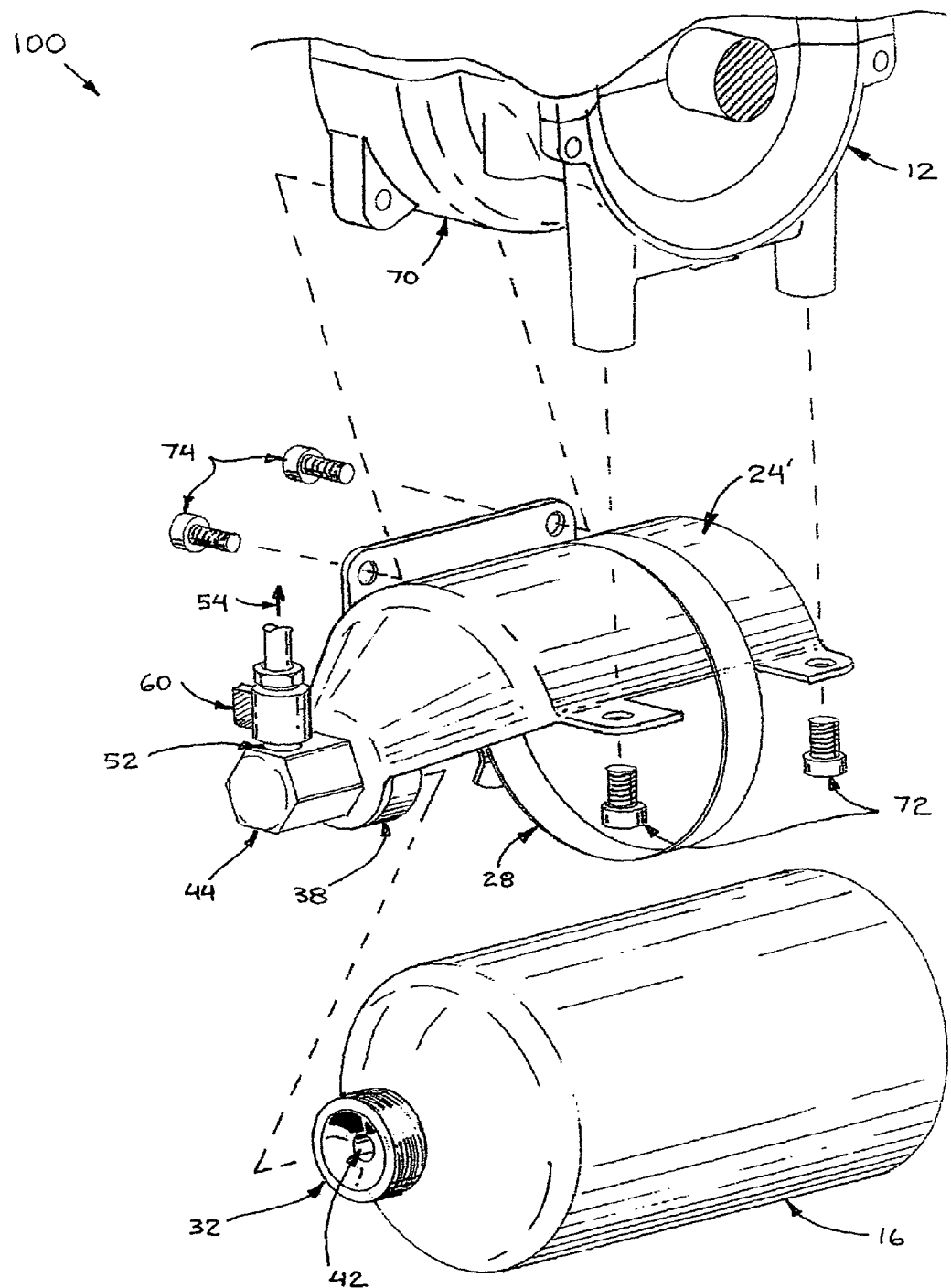

LPG FUELED INTERNAL COMBUSTION ENGINE POWERED DEVICES

REFERENCE TO RELATED APPLICATIONS

This Application is a continuation of our application Ser. No. 11/977,372, filed Oct. 24, 2007 now U.S. Pat. No. 7,878,170.

BACKGROUND OF THE INVENTION

1. Field of the Invention

This invention relates to Liquified Petroleum Gas (LPG) fueled internal combustion engine powered arrangements and, more particularly, to such arrangements in which the internal combustion engine is powered by the gas phase of the LPG at all times and may be as utilized in lawnmowers, weed whackers, leaf blowers, string trimmers and the like 2. Description of the Prior Art Utilization of LPG as a fuel for internal combustion engines has been heretofore been known for use in large internal combustion engine powered arrangements such as forklifts, trucks, buses and other such arrangements and devices. As such, the tank capacity of the LPG is quite large: on the order of 5 gallons or larger and in which the LPG is withdrawn from the LPG tank in liquid phase form and this requires that the LPG tanks be mounted in a particular orientation so that only liquid phase LPG is withdrawn therefrom during operation of the internal combustion engine 12. Further, the LPG tank is, generally, mounted in regions remote from the engine or any normally occurring heat source during operation and/or storage of the device.

During operation of such devices, the liquid phase LPG travels through transfer lines to either a vaporizer or a vaporizer/regulator structure. The vaporizer or vaporizer/regulator causes the liquid phase LPG to be converted to the gas phase LPG. The latent heat of vaporization of the liquid phase LPG as it is converted to the gas phase LPG would cause the vaporizer or vaporizer/regulator to get extremely cold and in many applications would freeze the liquid phase LPG to a solid phase and thus stop the flow of LPG to the engine unless means are provided to heat the vaporizer or vaporizer/regulator. Various structural arrangements have heretofore been utilized to supply heat to the vaporizer or vaporizer/regulator. In liquid cooled internal combustion engines the hot engine coolant was often routed to pass through or adjacent to the vaporizer or vaporizer/regulator in order to transfer heat thereto. In air cooled internal combustion engines some or all of the hot exhaust products may be forced over the vaporizer or vaporizer/regulator by the engine cooling fan. In other prior art applications, the LPG transfer lines may be placed in close proximity to the exhaust manifold or the vaporizer or vaporizer/regulator may be close coupled to the exhaust manifold for receiving heat therefrom.

In yet other prior art devices, an electrically powered heater was provided at the vaporizer or vaporizer/regulator.

Thus, such prior art applications and devices utilizing the large tanks of LPG often required many complex structural arrangements and components in order to insure that the liquid phase LPG was converted to the gas phase LPG.

In many other applications, the use of a large, e.g., 5 gallon LPG tank and its attendant complexity is not needed or desired. For example, in many smaller internal combustion engine powered devices, it is often desired to utilize a small LPG tank such as one containing one or two pounds of LPG. Such devices include, but are not limited to lawnmowers, leaf blowers, string trimmers, or the like. The one or two pound LPG tanks are readily available as such LPG tanks are widely utilized in the camping industry to provide LPG for portable for stoves, lamps and the like. However, in such applications, the LPG tank is oriented to provide that only the gas phase LPG exits the LPG tank and, therefore, the freezing of the LPG would occur in the LPG tank rather than external the LPG tank. Depending on the rate of flow of the gas phase LPG from the LPG tank, the freezing of the LPG occurs in the LPG tank.

However, in many applications it is desired that the mounting of the LPG tank be such that no specific orientation of the LPG tank is required for the internal combustion engine to operate on the gas phase of the LPG.

Accordingly, there has long been a need to provide an LPG fueled internal combustion engine apparatus utilizing propane as the LPG from a conventional one to two pound LPG propane tank for the supply of the LPG and which does not require a particular orientation of the LPG tank with respect to gravity for satisfactory operation. Additionally, many of the prior art LPG fueled internal combustion engine powered devices have utilized butane as the LPG. Such devices are common in many foreign countries such as Japan and Korea. In the United States and in Europe, on the other hand, propane LPG tanks are quite readily available. The physical properties of propane as compared to butane makes the propane LPG tanks more attractive as a fuel for the small internal combustion engine applications. For example, for an equivalent amount of LPG, a butane fueled device would run for about one half hour while for a propane fueled device would run for about three to four hours. Also, the butane LPG tanks that are readily available in Japan and Korea provide for only gas phase butane to be withdrawn from the bottle and are provided with an internal tube to insure that only gas is withdraw and thus require a preferred orientation with respect to gravity. Since liquid phase butane becomes a gas phase butane at about 31 degrees F. which is only about 39 degrees F. different from the conventionally stated standard operating temperature of a nominal 70 degrees F., there is little cooling effect due to the evaporation of the gas. Freezing in the LPG tank or in the system is not likely by utilization in a small internal combustion engine. Liquid phase propane, on the other hand, becomes gas phase propane at about minus 44 degrees F. which is about 114 degrees F. different from the conventionally stated standard operating temperature of a nominal 70 degrees F. Therefore, the propane would freeze to the solid phase in the LPG tank or elsewhere in the delivery system long before the LPG tank is empty depending on the consumption rate and the temperature. As contrasted to butane, the propane requires structure to prevent freezing to the solid phase.

Therefore, it is an object of the present invention to provide an LPG fueled internal combustion engine apparatus utilizing propane as the LPG.

It is another object of the present invention to utilize a conventional one to two pound LPG propane tank for the supply of the LPG.

It is another object of the present invention to provide an LPG fueled internal combustion engine apparatus utilizing propane as the LPG and in which the propane is provided from a conventional one to two pound LPG propane tank for the supply of the LPG.

It is another object of the present invention to provide an LPG fueled internal combustion engine apparatus utilizing propane as the LPG from a conventional one to two pound LPG propane tank for the supply of the LPG and which does not require a particular orientation of the LPG tank with respect to gravity for satisfactory operation.

It is another object of the present invention to provide an LPG fueled internal combustion engine apparatus utilizing propane as the LPG from a conventional one to two pound LPG propane tank for the supply of the LPG which does not require a particular orientation of the LPG tank with respect to gravity for satisfactory operation and in which the possibility of freezing of the liquid phase LPG to the solid phase LPG is substantially prevented in both the LPG tank and in the gas phase supply system to the internal combustion engine.

It is yet another object of the present invention to provide an LPG fueled internal combustion engine apparatus utilizing propane as the LPG from a conventional one to two pound LPG propane tank for the supply of the LPG which does not require a particular orientation of the LPG tank with respect to gravity for satisfactory operation and which insures that only gas phase LPG propane is withdrawn from the LPG tank regardless of the orientation thereof during operation.

SUMMARY OF THE INVENTION

The above and other objects of the present invention are achieved, in a preferred embodiment thereof as utilized in a LPG gas phase fueled internal combustion engine lawnmower. This embodiment has an LPG tank containing propane which has both a liquid phase LPG and a gas phase LPG therein mounted in a vertical orientation with respect to gravity so that liquid phase LPG is at the discharge valve of the LPG tank for the conventional operation of the lawnmower on a relatively flat surface though operation will also satisfactorily occur for any other orientation of the lawnmower such as, for example, on a sloping surface of lawn even though the gas phase LPG may be at the discharge valve.

The LPG tank is mounted by a mounting bracket on the internal combustion engine so as to be in both heat transfer relationship to a portion of the internal combustion engine from which the mounting bracket receives heat as well as in vibration receiving relationship to the internal combustion engine. The heat and vibration from the mounting bracket is transferred to the LPG tank and thus into the LPG in the LPG tank. The mounting bracket is also coupled to the discharge valve of the LPG tank so as to provide heating to the discharge valve.

The discharge valve of the LPG tanks utilized in the present invention has a spring biased poppet that is moved from a spring biased closed position to an open position when coupled to a standard mounting plug. The standard mounting plug has a probe that unseats the poppet when the mounting plug is attached to the discharge valve. As liquid phase propane starts to flow from the LPG tank under the force produced by the gas pressure in the LPG tank, the small size of the orifice at the poppet causes the liquid phase to vaporize into the gas phase. Since, depending on the flow rate of the liquid phase LPG through the poppet orifice, the latent heat of vaporization might cause the discharge vale to become so cold as to freeze the liquid phase LPG into the solid phase LPG, heat is supplied to the mounting plug at the discharge valve so as to heat the discharge valve and thus prevent freezing of the LPG. Such heating of the discharge valve may be provided by coupling a portion of the mounting bracket to the mounting plug.

The supply of gas phase LPG is passed from the mounting plug through a shutoff valve, through a pressure regulator and into the carburetor of the internal combustion engine. The carburetor is preferably a chokeless carburetor of conventional design and may, if desired, be incorporated as a single unit with the pressure regulator. The vacuum generated in the carburetor by the operation of the internal combustion engine draws the gas phase LPG into the carburetor. At substantially zero vacuum, no liquid phase LPG is drawn into the carburetor. Gas phase LPG is drawn into the carburetor commensurate only with the vacuum thereby providing that the gas phase LPG flow rate is at the rate demanded by the internal combustion engine.

Thus, according to the principles of the present invention regardless of whether the liquid phase of the LPG or the gas phase of the LPG is at the discharge port, satisfactory operation of the apparatus is insured.

In another embodiment of the present invention achieving the objects as stated above, the LPG tank may be mounted on an LPG fueled internal combustion engine driven leaf blower or a string trimmer. As such, in operation the leaf blower or string trimmer and, consequently, the LPG tank, may be in any orientation with respect to gravity. For the technological advances as described above, satisfactory operation is achieved by having only gas phase propane LPG flow from the LPG tank into fuel supply system to the internal combustion engine.

BRIEF DESCRIPTION OF THE DRAWING

The above and other embodiments of the present invention may be more fully understood from the following detailed description taken together with the accompanying drawing wherein similar reference characters refer to similar elements throughout and in which:

FIG. 3 illustrates another embodiment of the present invention as utilized in a string trimmer, leaf blower or the like; and FIG. 4 is an exploded view of the attachment of the LPG tank to the embodiment illustrated in FIG. 3.

DESCRIPTION OF THE PREFERRED EMBODIMENTS

Figure 1:
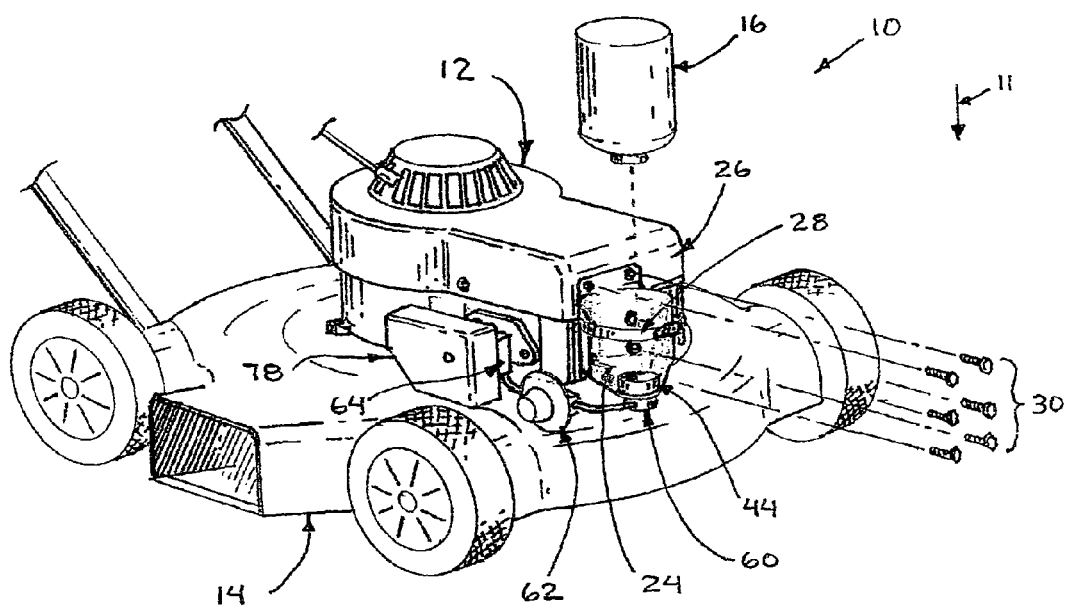
FIG. 1 is an exploded view of a preferred embodiment of the present invention as utilized in an LPG fueled internal combustion engine powered lawn mower.
Figure 2A:
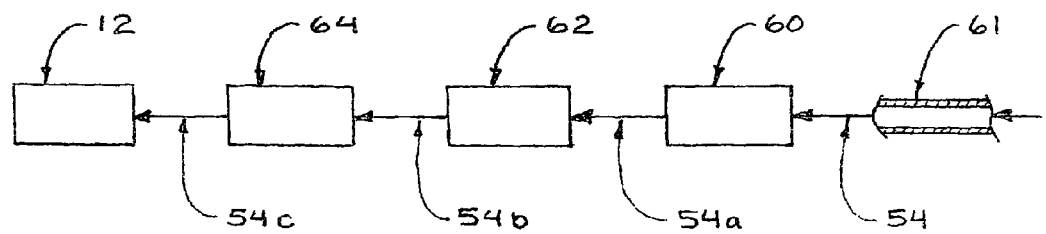
FIG. 2A is a block diagram illustrating the flow path of the fuel supply system of the present invention;.
Figure 2:
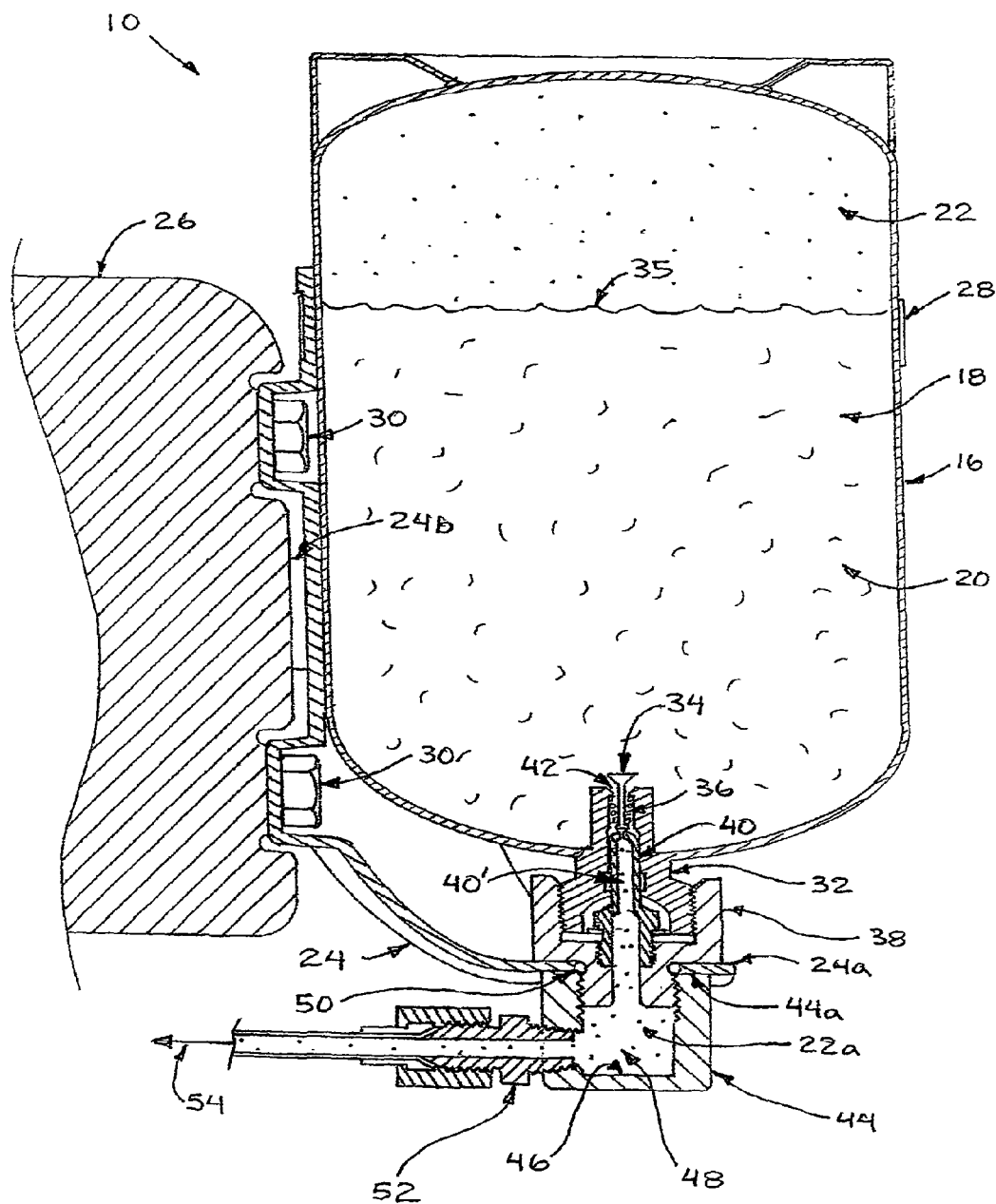
FIG. 2 is a sectional view showing the attachment of the LPG tank to the internal combustion engine in the embodiment illustrated in FIG. 1.

Referring now to the drawing, there is shown on FIGS. 1 and 2 an embodiment, generally designated 10, of an LPG fueled internal combustion engine apparatus utilizing the gas phase of propane as the LPG from a conventional one to two pound LPG propane tank for the supply of the gas phase LPG and which does not require a particular orientation of the LPG tank with respect to gravity for satisfactory operation. In embodiment 10, an internal combustion engine 12 is incorporated on a powered lawnmower 14. An LPG tank 16 is provided in a vertical orientation mounting position with respect to both gravity as indicted by the arrow 11 and the lawnmower 14 in the most common orientation of the lawnmower 14 during use which is generally horizontal. The LPG tank 16 contains a liquified petroleum gas 18 such as, preferably, propane, though the LPG propane may include a mixture of propane with small amounts of additives such as butane, propylene or other desired additives The LPG 18 in the tank 16 does not fill the tank completely so that there is both a liquid phase 20 and gas phase 22 of the LPG 18 in the tank 16. According to the principles of the present invention, the LPG utilized to fuel the internal combustion engine 12 is provided from the liquid phase 20 of the LPG which is vaporized to the gas phase at the discharge of the LPG tank and thus prior to introduction to the internal combustion engine 12.

A tank support bracket 24 is utilized for supporting the LPG tank 16 on the internal combustion engine 12. In the embodiment 10, the tank support bracket 24 is mounted on the cylinder head 26 by head bolts 30. The tank support bracket 24 preferably incorporates a quick release clamp 28, such as an over center clamp for coupling the LPG tank 16 to the tank support bracket 24, though other types of coupling arrangements such as an elastic band, a snap on latch, or even a hook and loop band or the like may be utilized as desired for particular applications. The tank support bracket 24 is fixed to the cylinder head 26 of the internal combustion engine 12 by, for example, cylinder head bolts 30.

The tank support bracket 24 is, in preferred embodiments of the present invention, closely coupled to a part of the internal combustion engine 12 so that it receives both vibration and heat from the internal combustion engine 12 during operation of the internal combustion engine 12. The vibration transferred from the internal combustion engine 12 to the tank support bracket 24 and thus to the LPG tank 16 and the LPG 18 provides agitation to the LPG 18 so as to aid in keeping the LPG 18 from freezing as the temperature thereof drops during the withdrawal of the LPG 18 therefrom, as described below in greater detail. Further, such agitation of the LPG 18 increases the surface area 35 of the LPG 18 in the tank 16 thereby causing an increase in the gas phase 22 of the LPG in the tank 16.

As shown more clearly in FIG. 2, in the conventional one to two pound propane LPG tanks utilized in the present invention is provided with a discharge valve 32. The discharge valve 32 has a spring biased poppet 34 normally biased into the closed position by spring 36. The discharge valve 32 is threaded into a mounting plug 38 having a probe 40 that unseats the poppet 34 against the bias of the spring 36 to allow the start of the flow of liquid phase LPG therethrough. However, the flow orifice 42 around the poppet is so small that the liquid phase propane 20 is vaporized into the gas phase propane 22a at the discharge valve 32 as it flows through the mounting plug 38. The probe 40 of the mounting plug 38 has walls defining a gas flow passage 40' therethrough.

A clamping nut 44 having walls 46 defining a gas storage volume 48 therein is provided and the gas volume 48 is in gas flow communication with the gas flow passage 40' and contains the gas phase propane 22a until gas phase propane is required by the internal combustion engine 12. The clamping nut 44 threadingly engages the mounting plug 38 at 44a and clamps a heating portion 24a of the mounting bracket 24 between the clamping nut 44 and the mounting plug 38. The heating portion 24a of the mounting bracket 24 heats the mounting plug 38, the discharge valve 32 and the clamping nut 44 to prevent any freezing of the gas phase propane flowing through the orifice 42 of the discharge valve. An "O" ring 50 may be provided between the clamping nut 44 and the mounting plug 38.

The gas phase propane 22a flows through a connector assembly 52 as indicated by the arrow 54.

A tank heating portion 24b of the mounting bracket 24 is in heat and vibration transfer relationship to the LPG tank 16 to heat and agitate the liquid phase LPG therein.

FIG. 2A illustrates a block diagram the flow path of the fuel system according to the principles of the present invention. As shown on FIG. 2A, the gas phase propane 22a flows from the storage volume 48 into a gas phase transmitting tube 61, through a shutoff valve 60 and for the shutoff valve in the open position thereof, into a gas phase transmitting tube 54a, through a pressure regulator 62 and into a chokeless carburetor 64 for transmission to the internal combustion engine 12 as indicated by the arrows 54a, 54b, and 54c. The shutoff valve 60, pressure regulator 62 and chokeless carburetor 64 may be of any desired commercially available gas phase design suitable for the purpose. When the shutoff valve 60 is opened, gas phase propane 22a from the storage volume 48 of the clamping nut 44 is allowed to flow to the internal combustion engine 12 in the amount as demanded by the vacuum created by the internal combustion engine 12.

Referring now to FIGS. 3 and 4 there is illustrated another preferred embodiment generally designated 100 of an LPG fueled internal combustion engine apparatus utilizing gas phase propane as the LPG from a conventional one to two pound LPG propane tank for the supply of the gas phase LPG and which does not require a particular orientation of the LPG tank with respect to gravity for satisfactory operation. The embodiment 100 is shown as incorporated in a weed whacker, string trimmer, leaf blower or the like. The power units of such devices are often strapped onto the back of the user and in use the user may bend to various degrees so that the orientation of the LPG tank may vary during operation with respect to the direction of gravity.

As shown on FIGS. 3 and 4, many of the components described above in connection with embodiment 10 may be utilized in embodiment 100. The LPG tank 16 is connected to the internal combustion engine 12 by the mounting bracket 24' which is generally similar to the mounting bracket 24 of embodiment 10 described above. The mounting bracket 24' is provided with a retaining strap 28 for securing the LPG tank 16 to the mounting bracket 24'. In embodiment 100 the mounting bracket 24' is coupled to the crankcase 70 of the internal combustion engine 12. The crankcase 70 is another portion of the internal combustion engine 12 which is heated during operation and thus heat and vibration are transferred from the crankcase 70 to the mounting bracket 24' and thus to the LPG tank 16 by the portion 24b' and to the discharge valve 32 by the portion 24a' to prevent conversion of the gas phase of the LPG flowing through the discharge valve 32 to the solid phase.

The mounting bracket 24' is retained against or in close proximity to the crankcase 70 to provide the heat transfer and vibration transfer thereto by bolts 72 and 74. The gas phase propane from the LPG tank 16 through the shutoff valve 60 to the pressure regulator 62 as indicated by arrow 54a, from the pressure regulator 62 to the carburetor 64 as indicated by the arrow 54b. The gas phase propane is mixed with air flowing into the air filter 78 and to the cylinder of the internal combustion engine 12.

In FIGS. 3 and 4, the cylinder 26' of the internal combustion engine 12 may be aligned vertically with respect to the direction of gravity 11 and the LPG tank mounted horizontally or at right angles to the cylinder 26'. This relationship between the cylinder 26' and the LPG tank 16 is maintained regardless of the orientation of the embodiment 100 with respect to the direction of gravity 11 as the user (not shown) may bend or twist during use. Thus, it is possible for either liquid or gas phase propane to be at the discharge valve 32. However, in accordance with the principles of the present invention, it makes no difference since there is heat transfer and vibration transfer to the contents of the LPG tank 16 as well as to the discharge valve 32. Therefore, regardless of whether the liquid phase LPG tends to freeze in the tank 16 or at the discharge valve 32 the heat and vibration transferred is sufficient to provide that there is gas phase propane flowing into the shutoff valve 60.

If the liquid level of the liquid propane in the LPG tank 16 is below the discharge valve 32 gas phase propane will flow therefrom to the shutoff valve 60. If the liquid level of the liquid phase propane in the LPG tank 16 is above the discharge valve 32, it is converted to the gas phase propane as described above. No matter where the freezing of the propane to the solid phase might occur, the heat transfer and vibration transfer prevents such freezing regardless of the flow rate of the propane.

A recoil starter of conventional design as indicated at 80 may be incorporated on the internal combustion engine 12 in the embodiment 100 and, if desired a similar recoil starter may be incorporated in the embodiment 10.

From the above it can be seen that there has been provided an improved gas phase fueled internal combustion engine adapted to power various types of devices. and in which only gas phase LPG flows from the LPG tank regardless of the orientation of the LPG tank with respect to gravity and regardless of whether liquid phase propane or gas phase propane is present at the discharge of the LPG tank. Such arrangements eliminate the need for costly and complex heating devices downstream from the LPG tank to convert the liquid phase propane to the gas phase propane before introduction thereof into the carburetor of the internal combustion engine.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A mounting arrangement for mounting an LPG tank containing both liquid phase and gas phase LPG therein on an internal combustion engine of the type adapted to be fueled by the gas phase of the LPG and in which the internal combustion engine powers a predetermined device and in which the LPG tank has a discharge valve of the type having a spring biased poppet biasing the poppet into the closed position thereof to prevent the release of either gas phase or liquid phase LPG from the LPG tank, comprising, in combination:
    a mounting plug coupled to the discharge valve and said mounting plug having:
        a probe for engaging the poppet of the discharge valve of the LPG tank to unseat the poppet against spring bias; whereby liquid phase LPG is converted to gas phase LPG in passage by the poppet; and,
        walls defining a gas flow passage for receiving the gas phase LPG from the discharge valve;
    a clamping nut coupled to the mounting plug and having walls defining a gas phase storage volume in gas flow communication with said gas flow passage of said probe of mounting plug;
    a discharge valve heating portion of a tank support mounting bracket clamped between said mounting plug and said clamping nut for transmitting heat and vibration to the regions containing said discharge valve to prevent the gas phase LPG from freezing and converting to the solid phase LPG;
    a gas phase transmitting tube coupled to said clamping nut for receiving said gas phase LPG from said gas phase storage volume of said clamping nut and allowing flow of said gas phase LPG therethrough;
    a gas phase LPG pressure regulator for receiving gas phase liquified petroleum gas for regulating the pressure of said gas phase LPG to the value required for operation of the internal combustion engine;
    a shutoff valve having an open position and a closed position for receiving gas phase LPG from said gas phase transmitting tube and transmitting said gas phase LPG to said gas phase LPG pressure regulator for said shutoff valve in an open position thereof and blocking the flow of LPG to said gas phase LPG pressure regulator for said shutoff valve in a closed position thereof;
    a chokeless carburetor for receiving gas phase LPG from said pressure regulator and mixing said gas phase LPG with ambient air in preselected proportions, and transmitting said mixture of gas phase LPG and ambient air to said internal combustion engine.

2. The arrangement defined in claim 1 and further comprising:
    an LPG tank heating portion of said mounting bracket in heat transfer and vibration transfer relationship to said LPG tank for heating and vibrating the LPG in said LPG tank to prevent the freezing of the LPG in said LPG tank.

3. The arrangement defined in claim 2 wherein:
    said coupling of said mounting nut to said discharge valve is a threading coupling.

4. The arrangement defined in claim 3 and further comprising:
    an "O" ring seal between said clamping nut, said discharge heating portion of said mounting bracket and said discharge valve of said LPG tank.

5. The arrangement defined in claim 1 wherein:
    said mounting bracket is mounted in heat and vibration transfer relationship to a cylinder head of the internal combustion engine.

6. The arrangement defined in claim 5 wherein:
    said mounting bracket is bolted to said internal combustion engine.

7. The arrangement defined in claim 1 wherein:
    said LPG tank is mounted vertically with respect to the direction of gravity to provide liquid phase LPG at said discharge valve of said LPG tank during substantially the normal operation of the device powered by said internal combustion engine.

8. The arrangement defined in claim 7 wherein the device is a powered lawnmower.

9. The arrangement defined in claim 1 wherein:
    said LPG tank is mounted at right angles to the direction of gravity for the device in an upright position whereby either liquid phase or gas phase LPG may be present at the discharge valve of said LPG tank depending on the orientation of the device with respect to the direction of gravity and the amount of LPG in the LPG tank.

10. The arrangement defined in claim 9 wherein:
    said device is selected from the class consisting of string trimmers, leaf blowers and weed whackers.

11. A mounting arrangement for mounting an LPG tank containing both liquid phase and gas phase LPG therein on an internal combustion engine of the type adapted to be fueled by the gas phase of the LPG and in which the internal combustion engine powers a predetermined device and in which the LPG tank has a discharge valve of the type having a spring biased poppet biasing the poppet into the closed position thereof to prevent the release of either gas phase or liquid phase LPG from the LPG tank, comprising, in combination:
    a mounting plug coupled to the discharge valve and said mounting plug having:

a probe for engaging the poppet of the discharge valve of the LPG tank to unseat the poppet against spring bias; whereby liquid phase LPG is converted to gas phase LPG in passage by the poppet; and, walls defining a gas flow passage for receiving the gas phase LPG from the discharge valve;

a clamping nut coupled to the mounting plug and having walls defining a gas phase storage volume in gas flow communication with said gas flow passage of said probe of mounting plug;

a discharge valve heating portion of a tank support mounting bracket clamped between said mounting plug and said clamping nut for transmitting heat and vibration to the regions containing said discharge valve to prevent the gas phase LPG from freezing and converting to the solid phase LPG, and said mounting bracket coupled to the internal combustion engine for receiving at least one of heat and vibration therefrom and transmitting said at least one of said heat and vibration to the LPG tank for heating and/or vibrating the LPG contained in the tank, and said mounting bracket having an arcuate LPG tank heating portion for engaging the surface of said LPG tank;

a gas phase transmitting tube coupled to said clamping nut for receiving said gas phase LPG from said gas phase storage volume of said clamping nut and allowing flow of said gas phase LPG therethrough;

a gas phase LPG pressure regulator for receiving gas phase liquified petroleum gas for regulating the pressure of said gas phase LPG to the value required for operation of the internal combustion engine;

a shutoff valve having an open position and a closed position for receiving gas phase LPG from said gas phase transmitting tube and transmitting said gas phase LPG to said gas phase LPG pressure regulator for said shutoff valve in an open position thereof and blocking the flow of LPG to said gas phase LPG pressure regulator for said shutoff valve in a closed position thereof;

a chokeless carburetor for receiving gas phase LPG from said pressure regulator and mixing said gas phase LPG with ambient air in preselected proportions, and transmitting said mixture of gas phase LPG and ambient air to said internal combustion engine.

12. The arrangement defined in claim 11 and further comprising:

said arcuate LPG tank heating portion of said mounting bracket in at least one of heat transfer and vibration transfer relationship to said LPG tank for heating and/or vibrating the LPG in said LPG tank to prevent the freezing of the LPG in said LPG tank.

13. The arrangement defined in claim 12 wherein:
the LPG tank has an arcuate outer surface.

14. The arrangement defined in claim 13 wherein:
said arcuate outer surface of said LPG tank is substantially the same curvature as said arcuate LPG tank heating portion of said mounting bracket.

15. The arrangement defined in claim 14 wherein:
said mounting bracket transmits both heat and vibration to said LPG tank.

16. The arrangement defined in claim 14 wherein:
substantially all of said arcuate LPG tank heating portion of said mounting bracket is in contact with said arcuate outer surface of said LPG tank.

17. The arrangement defined in claim 1 and further comprising:

a retaining strap on said mounting bracket and said retaining strap for securing said LPG tank to said mounting bracket.

* * * * *